United States Patent [19]

Gappa et al.

[11]  4,265,767

[45] * May 5, 1981

[54] METHOD AND APPARATUS FOR PURIFICATION OF WASTE WATER

[75] Inventors: Ginther Gappa, Gelsenkirchenbuer; Harold Jintgen; Jirgen Klein, both of Essen, all of Fed. Rep. of Germany

[73] Assignee: Bergwerksverband GmbH, Essen, Fed. Rep. of Germany

[*] Notice: The portion of the term of this patent subsequent to May 13, 1997, has been disclaimed.

[21] Appl. No.: 47,201

[22] Filed: Jun. 11, 1979

Related U.S. Application Data

[63] Continuation of Ser. No. 663,986, Mar. 4, 1976, abandoned, which is a continuation-in-part of Ser. No. 602,000, Aug. 5, 1975, Pat. No. 4,202,770.

[30] Foreign Application Priority Data

Aug. 6, 1974 [DE] Fed. Rep. of Germany ....... 2437745

[51] Int. Cl.³ ............................................. B01D 15/02
[52] U.S. Cl. .................................... 210/662; 210/189; 210/289
[58] Field of Search ................... 210/25, 33, 96.1, 189, 210/268, 279, 289, 291

[56] References Cited

U.S. PATENT DOCUMENTS

| | | | |
|---|---|---|---|
| 1,770,580 | 7/1930 | Neumann | 210/289 |
| 2,057,887 | 10/1936 | Elliott et al. | 210/268 |
| 3,878,096 | 4/1975 | Somogi | 210/189 |
| 3,915,861 | 10/1975 | Marquardt | 210/189 |
| 3,998,731 | 12/1976 | Franzen | 210/33 |

FOREIGN PATENT DOCUMENTS 445352 11/1912 France ...................................... 210/189

*Primary Examiner*—Ivars C. Cintins
*Attorney, Agent, or Firm*—Michael J. Striker

[57] ABSTRACT

An apparatus for purification of waste water includes an upright adsorber filled with inorganic granular adsorption material flowing in downward direction through the adsorber while waste water is fed in upward direction therethrough. The adsorber has a frustoconical outlet portion in which an inlet cone, having a perforated upwardly tapering wall, is provided into which the waste water is fed to assure a substantially even distribution of the waste water in the column of granular adsorption material during the upward flow of the waste water through the adsorber.

8 Claims, 1 Drawing Figure

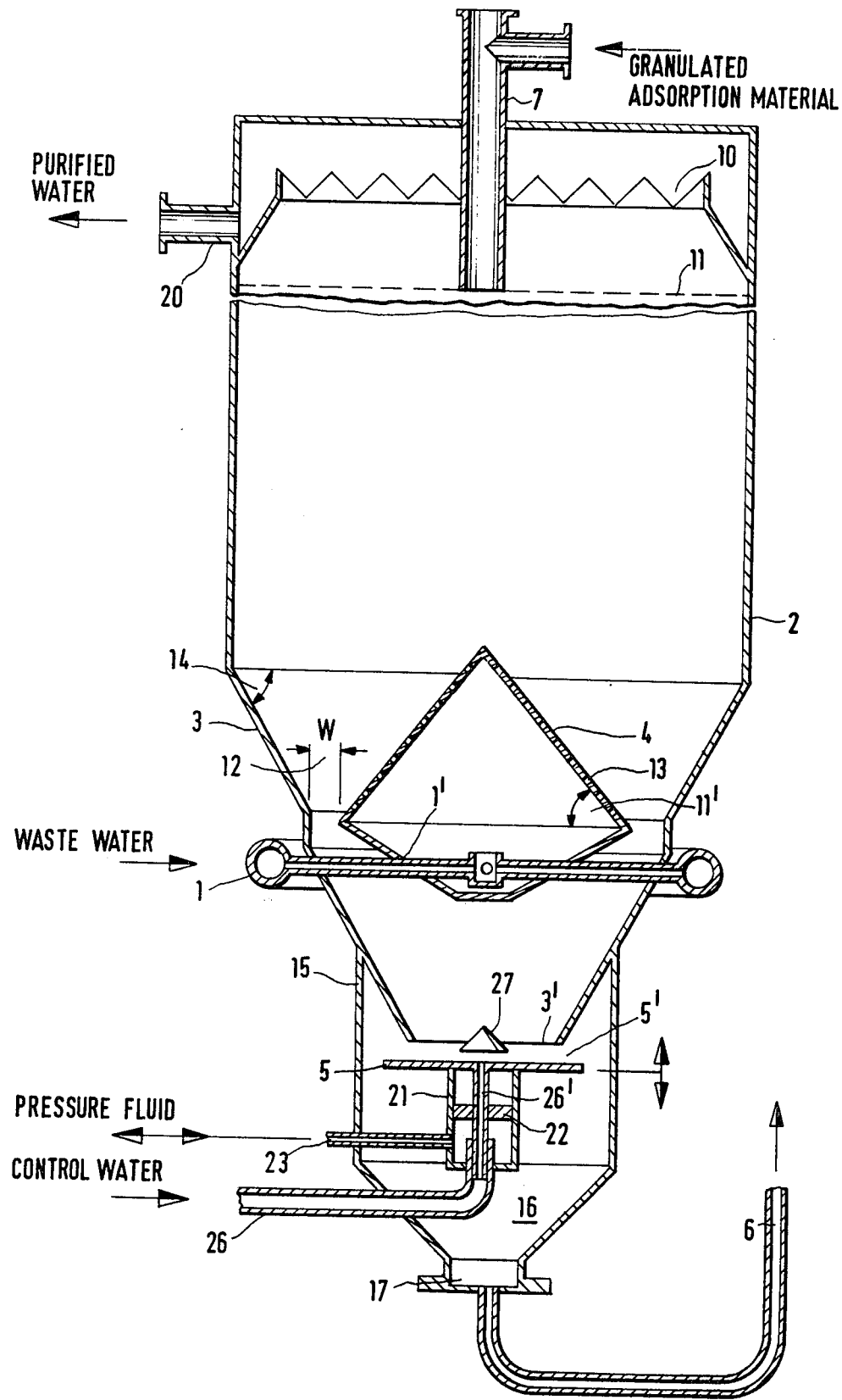

METHOD AND APPARATUS FOR PURIFICATION OF WASTE WATER

CROSS-REFERENCE TO RELATED APPLICATION

This is a continuation of application Ser. No. 663,986, filed Mar. 4, 1976, now abandoned, which in turn is a continuation-in-part of application Ser. No. 602,000, filed Aug. 5, 1975, now U.S. Pat. No. 4,202,770.

BACKGROUND OF THE INVENTION

As mentioned above, the present application is a continuation-in-part application of the application Ser. No. 602,000 filed by the same inventors on Aug. 5, 1975.

This prior application discloses an apparatus for the purification of waste water by means of an adsorber filled with active carbon, in which the active carbon moves in downward direction through the upright adsorber while the waste water to be purified passes in countercurrent direction to the stream of active carbon through the adsorber. In this apparatus the adsorber is provided with a frustoconical outlet portion, the generatrix of which includes with a horizontal line an angle between 55 and 50° and in which in the upper third of the frustoconical outlet portion of the adsorber a distributor cone is arranged, the generatrix of which includes with a horizontal line an angle between 45 and 55°. The distributor cone has an upwardly tapering conical wall provided with a plurality of apertures, the sum of the open cross-section of which is between 0.1 and 1% of the transverse cross-section of the adsorber. The waste water is fed into the distributor cone so that the waste water passes properly distributed in upward direction through the column of active carbon formed in the adsorber to be discharged from the latter in the region of the upper end thereof above the level of the column of active carbon formed therein. The base of the distributor cone forms with an opposite annular portion of the frustoconical outlet portion of the adsorber an annular gap of a width between 50 and 100 millimeters through which the active carbon passes to the outlet opening at the lower end of the frustoconical outlet portion of the adsorber.

Surprisingly it has now been ascertained that an apparatus of the aforementioned kind may also be used for purification of waste water if, instead of active carbon, other inorganic granulated adsorption material is used for the removal of organic material from the waste water. A suitable adsorption material is, for instance, kieselguhr, silica gel or $Al_2O_3$ in pelletized or granulated form. When granulated adsorption material of the aforementioned kind is used it is necessary to adapt the apparatus of the above-mentioned prior application to the greater density of the aforementioned granulated adsorption material and to the resulting greater friction between the individual granules, as well as the greater friction between the granules and the walls of the various elements of the adsorber.

SUMMARY OF THE INVENTION

It is an object of the present invention to provide an apparatus for the purification of waste water in which inorganic granular adsorption material is used for the removal of organic matter from the waste water.

It is a further object of the present invention to provide an apparatus of the aforementioned kind in which the waste water is evenly distributed throughout a column of inorganic granular adsorption material in an upright adsorber so as to improve the efficiency of the apparatus.

With these and other objects in view, which will become apparent as the description proceeds, the apparatus according to the present invention for purification of waste water with inorganic granular adsorption material, broadly comprises an upright adsorber having an upper end and a frustoconical outlet portion defining a lower outlet opening, inlet means for continuously feeding inorganic granular adsorption material into the upper end of the adsorber so that the material, while forming a column in the adsorber, flows downwardly in the latter and leaves the adsorber through the outlet opening, a distributor cone arranged in the region of the upper third of the frustoconical outlet portion, in which the distributor cone has an upwardly tapering conical wall provided therein with a plurality of closely adjacent small apertures, and in which the closed base of the distributor cone defines between its circumference and the adjacent wall portion of the frustoconical outlet portion an annular gap through which the granular adsorption material passes to the outlet opening. The waste water is fed continuously into the distributor cone so as to flow upwardly through the apertures and the granular adsorption material in the adsorber to be discharged as purified water in the region of the upper end of the adsorber above the level of the column of adsorption material therein.

The granular adsorption material is preferably $Al_2O_3$ with grain size of 1–3 mm, but kieselguhr or silica gel may also be used as granular adsorption material. In accordance with the greater density of such material the angle of a generatrix of the frustoconical outlet end of the adsorber with a horizontal line is between 50 and 70°, preferably 60°, whereas the angle of a generatrix of the distributor cone with a horizontal line is between 40 and 60°, preferably 50°.

Preferably the sum of the open cross-section of the apertures in the distributor cone is between 0.1 and 1% of the transverse cross-section of the adsorber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing schematically illustrates in cross-section the apparatus according to the present invention.

DESCRIPTION OF THE PREFERRED EMBODIMENT

Referring now to the drawing, it will be seen that the apparatus for purification of waste water according to the present invention comprises an upright adsorber 2 having an upper cylindrical portion and a lower frustoconical outlet portion 3, defining at its bottom an outlet opening 3'. Granulated inorganic adsorption material, preferably $Al_2O_3$, is continuously fed through an inlet conduit 7 into the upper end of the adsorber 2, to flow downwardly in the latter and to leave through the outlet end 3', while forming a column of such material in the adsorber with an upper level as indicated at 11. A distributor cone 4, having its base approximately in the upper third of the outlet cone 3, is provided centrally in the adsorber 2 and the conical upwardly tapering wall of the distributor cone is provided with a plurality of substantially evenly distributed small apertures 13. The sum of the open cross-section of the apertures 13 is about 0.1–1% of the transverse cross-section of the adsorber above the distributor cone. The base of the distributor cone defines between the circumference of the base and the wall of the outlet cone an annular gap 12, the width w of which is between 50 and 100 millimeters. The angle 14 between a generatrix of the outlet cone 3 and a horizontal line is between 50 and 70°, preferably 60°, whereas the corresponding angle 11 of the distributor cone is between 40 and 60°, preferably 50°. An annular conduit 1 surrounds the frustoconical outlet portion of the adsorber, into which waste water is fed from a source, not shown in the drawing, and from which a plurality of conduits 1' lead into the interior of the distributor cone 4, so that the waste water fed into the interior of the latter, will pass upwardly through the aperture 13 provided therein through the downwardly moving column of the granulated adsorption material. The waste water before being fed into the conduit 1 is preferably first filtered, by being passed through a multilayer filter, not shown in the drawing.

By arranging the sum of the open cross-section of the apertures 13 in the distributor cone relative to the transverse cross-section of the adsorber in the manner mentioned above, the pressure loss of the waste water due to the passage through the apertures will be substantially equal to the pressure loss of the waste water during the passage thereof through the column of granulated adsorption material so that a uniform distribution of the waste water through the column of adsorption material in the adsorber 2 is obtained. The annular gap 12 between the base of the distributor cone 4 and the corresponding portion of the frustoconical outlet end 3 will assure a uniform discharge of the granulated adsorption material through the whole cross-section of the adsorber.

Wall means 15 are connected to the wall defining the outlet cone 3, to define below the outlet opening 3' a compartment 16, preferably of a shape as schematically shown in the drawing. A discharge disc 5, preferably of a diameter larger than that of the outlet opening 3', is arranged in the compartment 16 coaxially with and downwardly spaced from the outlet opening 3' to define with the latter a gap 5'. The granulated adsorption material passing downwardly through the adsorber 2 through the gap 12 and the outlet opening 3' is discharged, ladden with organic contaminants from the waste water, over the discharge disc 5 into the compartment 16, the discharge end 17 of the latter, into a conduit 6 from where it is hydraulically transported into a regenerator of known construction, not shown in the drawing, and from there it is likewise hydraulically transported back to the inlet conduit 7 of the adsorber. An overflow weir 10 provided with a zig-zag upper edge is preferably mounted in the region of the upper end of the adsorber 2, above the level 11 of the column of granulated adsorption material therein, and the purified water flowing over the edge of the weir 10 is discharged from the adsorber through the outlet conduit 20.

The height of the gap 5' between the outlet end 3' of the frustoconical outlet portion of the adsorber and the discharge disc 5 is preferably adjustable, as indicated by the vertical double arrow in the drawing, for rough adjusting the speed at which the granulated adsorption material will pass through the adsorber. For this purpose, a cylinder 21 may be arranged centrally in the compartment 16 and a piston 22 is connected to the discharge disc 5, so that by feeding pressure fluid through a conduit 23 into and out of the cylinder portion beneath the piston 22, the discharge disc 5 may be raised or lowered to thereby adjust the vertical height of the gap 5'.

The fine regulating of the speed at which the adsorption material passes in downward direction through the adsorber is carried out by feeding control water through a branch conduit 26, branching off from the conduit feeding continuously waste water into the annular conduit 1, and this branch conduit 26 leads through the cylinder 21 and the piston 22 therein and has an outlet opening at the center of the discharge disc. The upper portion 26' of the conduit 26 is fixed to the disc and the piston 22 and is telescopically connected to the remainder of the conduit in the cylinder 21 as schematically shown in the drawing. A valve, not shown in the drawing, is arranged in the branch conduit 26 so that the amount of waste water which is passed through the conduit 26 may be controlled. A fixed, rigid element 27, located centrally in the outlet opening 3' opposite the outlet end of the conduit 26, will deflect the waste water portion passing through the conduit 26 in radial direction, as indicated by the arrows in the Figure, so that a localized fluidization of the adsorption material will be produced to thereby adjust the speed at which the granulated adsorption material is discharged from the adsorber through the outlet opening 3'.

In a build apparatus according to the invention the diameter of the cylindrical portion of the adsorber is 1.8 meters. The upper conical portion of the distributor cone 4 is provided with 1,125 apertures 13 having each a diameter of 3 millimeters. The base diameter of the cone 4 is 1.1 meter and the width w of the annular gap 12 between the base of the distributor cone 4 and the adjacent wall of the frustoconical portion 3 of the adsorber is 75 millimeters.

In order to ascertain the relative movement of the adsorption material in the adsorber 2, eight colored layers of the adsorption material, each of a thickness of 5 millimeters and spaced at a distance of 50 centimeters from each other have been provided, with the lowest of the layers at the point of the distributor cone 4. The discharge speed of the adsorption column was varied between 0.1 and 1 meter per hour. Thereby it has been ascertained that the colored layers have been maintained, with the exception of a small annular outer zone, undisturbed up to the region at which the adsorption material moves past the cone 4.

In order to ascertain the distribution of the waste water throughout the cross-section of the adsorber, the waste water has been colored above the middle of the column of adsorption material. Thereby it has been ascertained that, at a flow speed of the waste water between 5 and 20 meters per hour, the liquid column is moved upwardly like a piston.

It will be understood that each of the elements described above, or two or more together, may also find a useful application in other types of apparatus for purification of waste water differing from the types described above.

While the invention has been illustrated and described as embodied in an apparatus for purification of waste water with inorganic granular adsorption material in an upright adsorber, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of purifying contaminated fluids in an upright vessel, comprising the steps of continuously admitting a flow of inorganic particulate purifying material into an upper end portion of the vessel, for downward movement therein; continuously admitting a flow of contaminated fluid into a confined space located in a lower end portion of the vessel and bounded in part by an upwardly tapering conical upper wall a generatrix of which includes with a horizontal line an angle of 40°–60°; continuously discharging the contaminated fluid from the confined space through a plurality of closely adjacent substantially uniformly arranged apertures in the upper wall, in form of individual upwardly flowing streams which are distributed over the entire cross-sectional area of the lower vessel end portion so that a purification front develops at which the downwardly moving inorganic particulate material is laden over the entire vessel cross-section with impurities removed from the upwardly moving contaminated fluid; and maintaining the location of the purification front substantially steady relative to the downwardly moving particulate material and to the vessel at a preselected level of the vessel.

2. A method as defined in claim 1; further comprising the steps of continuously measuring the concentration of contaminants in the contaminated fluid in the vessel; generating a signal indicative of the concentration; and regulating the addition of the fresh inorganic particulate material and withdrawal of spent inorganic particulate material from the vessel, at a rate continuously proportional to the magnitude of said signal.

3. A method as defined in claim 1, wherein said particulate material is an inorganic adsorbent material, and the purification of the liquid comprises adsorbing impurities from said liquid on said inorganic adsorbent material.

4. A method as defined in claim 1, wherein said particulate material is selected from the group consisting of Kieselguhr, silica gel and $Al_2O_3$.

5. A method as defined in claim 1, wherein said particulate material is $Al_2O_3$.

6. Apparatus for purifying contaminated fluids with a particulate inorganic material, comprising an upright vessel having an upper end portion and a lower end portion; first means for continuously admitting a flow of particulate inorganic material into said upper end portion, for downward movement in said vessel; a generally conical hollow distributing element in said lower end portion and having an upwardly tapering wall provided with a plurality of substantially uniformly arranged apertures and a generatrix of which includes with a horizontal line an angle of 40°–60°; and second means for admitting a continuous flow of contaminated fluid into said hollow distributing element, so that the fluid escapes therefrom through said apertures in form of a plurality of individual upwardly flowing streams which due to said angle are distributed over the entire cross-section of said lower end portion, whereby a purification front develops at which the downwardly moving inorganic particulate material is laden over the entire vessel cross-section with impurities removed from the fluid and which front can be maintained substantially steady relative to the downwardly moving particulate material and to the vessel at a preselected level of the vessel.

7. Apparatus as defined in claim 6, wherein said angle is 50°.

8. Apparatus as defined in claim 6, said vessel having a conically shaped lower section provided with said lower end portion and in which said distributing element is mounted, the angle included between a generatrix of said lower end section and a horizontal line being between 50 and 70°.

* * * * *